United States Patent [19]

Chung

[11] 4,073,858
[45] Feb. 14, 1978

[54] SHOCK ABSORBING UNIT MOLDED FROM POLYURETHANE (UREA) RUBBER COMPOSITION

[75] Inventor: Daniel A. Chung, North Canton, Ohio

[73] Assignee: The Goodyear Tire & Rubber Company, Akron, Ohio

[21] Appl. No.: 710,497

[22] Filed: Aug. 2, 1976

Related U.S. Application Data

[63] Continuation of Ser. No. 565,998, April 7, 1975, abandoned.

[51] Int. Cl.² ............ B32B 31/06; C08G 18/32; C08G 18/42; F16F 3/08
[52] U.S. Cl. ............ 264/262; 213/7; 260/75 NH; 260/77.5 AM; 260/77.5 AN; 267/152; 428/425
[58] Field of Search ........ 260/75 NH, 77.5 AM, 260/77.5 AN; 267/63 A, 152; 428/425; 264/262

[56] References Cited

U.S. PATENT DOCUMENTS

| | | | |
|---|---|---|---|
| 2,755,056 | 7/1956 | Hutton | 267/63 A |
| 2,942,872 | 6/1960 | Muller | 267/63 A |
| 3,504,901 | 4/1970 | Ditty | 267/1 |
| 3,677,869 | 7/1972 | Chung et al. | 161/42 |
| 3,755,261 | 8/1973 | Van Gulick | 260/77.5 AM |
| 3,845,021 | 10/1974 | Dukes et al. | 260/75 NH |
| 3,888,831 | 6/1975 | Kogon | 260/77.5 AM |
| 3,891,606 | 6/1975 | Kogon | 260/77.5 AM |

Primary Examiner—H.S. Cockeram
Attorney, Agent, or Firm—F. W. Brunner; H. C. Young, Jr.

[57] ABSTRACT

A shock absorbing element, suitable for use in a railroad draft gear, as well as a resilient polyureaurethane composition therefor, said element characterized by a compressive cycling test as well as preferably a cold temperature compression test, where said polyureaurethane is prepared by reacting a complex of 4,4'-methylene dianiline and a salt with the reaction product of selected diisocyanates and manipulatively selected polymeric polyols. An assembly of such shock absorbing elements is also disclosed under compression in a cylinder suitable as a railroad shock absorbing draft gear.

11 Claims, 3 Drawing Figures

SHOCK ABSORBING UNIT MOLDED FROM POLYURETHANE (UREA) RUBBER COMPOSITION

This is a continuation of application Ser. No. 565,998 filed April 7, 1975 and now abandoned.

This invention relates to shock absorbing units for railroad draft gears, an assembly of such units as a draft gear and to a method of preparing the units. The invention particularly relates to such shock absorbing units containing shock absorbing elements comprised of a polyureaurethane prepared with a complex of 4,4'-methylene dianiline.

Railroad draft gear shock absorbing units have undergone an evolutionary state of development. The small individual units must dynamically withstand repetitive shock of great magnitude without substantially deteriorating. The shock absorbing units must present a balance between dynamic compression and physical composition in order to both absorb and shock and resist softening under repetitive shock loads. A softened shock absorber simply transmits rather than absorbs shock.

Draft gear shock absorbing units, or pads, prepared with 4,4'-methylene dianiline as a curative have typically failed early in dynamic compression cycling resistance as evidenced by a shearing of the polyureaurethane element elastomer. Therefore, 4,4'-methylene dianiline, a useful polyurethane curative for many purposes, has typically been unsatisfactory for the preparation of railroad draft gears or buffers.

In view of these difficulties, it should further be expected that a draft gear shock absorbing unit utilizing the 4,4'-methylene dianiline complex, particularly with plasticizer, would exhibit a substantially inferior resistant to both dynamic endurance and softening under the demanding requirements of a required characteristic dynamic compressive cycling test.

Such a test is used as a measure for determining suitable shock absoring units for railroad draft gears, in addition to normally required deflection, low temperature and drop hammer tests involving visual evidence of destruction of a unit. Although more subtle, the softening test is a most valuable evaluation method for determining the ability of a unit to absorb the repetitive, large shocks.

The softening determination aspect of a compressive cycling test can be exemplified by obtaining a resilient shock absorbing element comprising a resilient composition of a short cylindrical shape measuring about 6.5 inches diameter and about 1.5 inches high with its sides in the shape of a concave V and with its ends covered and adhered to the face of circular steel plates and cycling said element under substantially constant compression alternating between a maximum of about 45 to about 55 percent of its original uncompessed polyureaurethane element height and a minimum of about 8 to about 12 percent of its said original height. Thus, the unit is always under some degree of compression with about 55 percent being the maximum. The force necessary to achieve the maximum compression (about 55 percent) is measured.

The polyureaurethane element itself constantly undergoes a very substantial change as it is compressed and decompressed during each dynamic cycle. Under this relatively severe test, a typical unit can break down or crack within about 50 to about 100 cycles. However, a suitable unit for railroad draft gears service should last or withstand at least about 500 cycles.

A suitable unit for railroad draft gear service should maintain its compression resistance, or resistance to softening, by requiring at least about 4200 pounds per square inch to compress the unit about 50 percent of its original uncompressed height after about 500 cycles of the compressive cycling test.

Polyureaurethane formulations have successfully been devised for shock absorbing units for railroad draft gears through intricate manipulation of diamine curatives, diisocyanates and a manipulative balance of polymeric polyol choice and molecular weight innerplay. However, it has remained that sterically unhindered diamines of the methylene-dianiline-type have not been commercially useful in such a manipulation because of its relatively high curing rate when used to cure appropriate aromatic diisocyanate polyurethane prepolymers.

Therefore, in view of these substantial and demanding shock absorbing compression endurance requirements, and in view of heretofore difficulties in the use of methylene dianiline-type curatives, it is an object of this invention to provide an improved resilient shock absorbing unit.

In accordance with this invention, it has been discovered that a shock absorbing element comprises a shaped resilient polyureaurethane composition characterized by (A) withstanding compressive cycling for at least about 500 cycles under constant compression alternating between a maximum of about 45 to about 55 percent and a minimum of about 8 to about 12 percent of its original uncompressed height, (B) requiring at least about 4200 pounds per square inch to compress said unit 55 percent of its original uncompressed height after 500 cycles of said compressive cycling, and (C) deflecting from about 0.3 to about 0.6 inch, preferably from about 0.4 to about 0.5 inch, at about 25° C upon the application of about 1800 pounds per square inch uniformly to the end surface areas of the said resilient compositions in its uncompressed state when the said composition is a generally disc-shaped cylindrical element with circular parallel end surfaces, said surfaces covered and adhered to circular steel plates, having a diameter of about 6.5 inches, a height of about 1.5 inches and a sidewall connecting the end surfaces substantially in the form of a V-shaped groove having substantially equal length sides, the said groove extending between the said end surfaces, the volume of the solid portion of said element being about 140 to about 160 percent, preferably about 150 percent, of the volume of the said groove, where said resilient shock absorbing polyureaurethane composition is prepared by the method which comprises reacting a complex of 4,4'-methylene dianiline and a salt selected from sodium chloride, sodium bromide, sodium iodide, sodium nitrite, lithium chloride, lithium bromide, lithium iodide, lithium nitrite and sodium cyanide, where the mole ratio of said dianiline to said salt is about 3/1, with the reaction product of (A) a diisocyanate selected from toluene diisocyanate, 1,5-naphthalene diisocyanate, 3,3'-bitolylene-4,4'-diisocyanate, diphenylmethane-4,4'-diisocyanate, and 3,3'-dimethyldiphenylmethane-4,4'-diisocyanate and (B) a mixture of at least one polymeric polyol having a total average molecular weight in the range of about 1000 to about 1800, preferably about 1150 to about 1500, selected from:

1. a mixture of about 55 to about 70 weight percent of at least one polymeric polyol having an average molecular weight of about 1800 to about 2200 comprised of (a) about 25 to about 40 weight percent polyether polyol and, correspondingly, (b) about 75 to about 60 weight percent polyester polyol and, correspondingly, about 45 to about 30 weight percent of a polyether polyol having a molcular weight in the range of about 800 to about 1200, 2. a caprolactone polyester of ε-caprolactone and diethylene glycol having a molecular weight in the range of about 1000 to about 1400, preferably about 1150 to about 1350, or 3. a mixture of about 55 to about 70 weight percent of at least one polyol having an average molecular weight in the range of about 1800 to about 2200 which comprises (a) about 25 to about 40 weight percent polyester polyols and (b) about 75 to about 60 weight percent polyether polyols, and correspondingly about 45 to about 30 weight percent of at least one polyol selected from polyester and polyether polyols having a molecular weight in the range of about 800 to about 1200; wherein said polyether polyol is selected from polytetramethylene ether glycol and polypropylene ether glycol, and said polyester polyol is selected from (i) caprolactone polyesters pepared from caprolactones containing 6 to 8 carbon atoms and glycols containing 4 to 7 carbon atoms and (ii) azelates of azelaic acid and glycols containing 4 to 7 carbon atoms, and hexane diol adipate, preferably the azelates, where the ratio of isocyanato groups to the sum of hydroxyl groups of the polyols is in the range of about 1.8 to about 2.5, where the ratio of primary amino groups of the diamine to excess isocyanato groups over the sum of said hydroxyl groups is about 0.7 to about 1.1 and where the acid number of the polyols is less than about 1.

In further accordance with this invention, shock absorbing unit, suitable for use in a railroad draft gear, comprises said shock absorbing element, the said element comprising said solid disc-shaped resilient polyureaurethane composition of this invention having the said characteristic compression endurance, said resistance to softening and said deflection characteristics at about 25° C and having two opposing and substantially parallel force-receiving surfaces connected by an indented, such as a substantially V-shaped, sidewall, and having rigid force-receiving metal plates adhered to its force-receiving surfaces.

Correspondingly, the shock absorbing device of a railroad draft gear comprises an assembly of a series of about 8 to about 12, preferably 10, of said units, loaded under compression in a cylinder in series to the shock load, with their force-receiving plates facing against each other.

The resilient polyureaurethane compositions of this invention are further preferably characterized by a −40° C cold temperature compression test in addition to the deflection characterization test at about 25° C. According to this test, the said composition at about −40° C when shaped and cured to a solid circular disc with a straight sidewall having a diameter of about 1.13 inch and a thickness of about 0.5 inch, requires a maximum pressure of 8000, and preferably a maximum pressure of 6000, pounds per square inch, applied to its flat surfaces to compress the disc 40 percent. This cold temperature compression test is a measure of stiffening of the polyureaurethane composition at low temperatures. It is a measure of the composition's ability to absorb energy without hardening and transmitting shock directly without absorption. A shock absorber of this invention has essentially bottomed out when its percent compression is substantially constant and its percent compression versus load curve substantially horizontal at high load values. The quality of high energy absorption without bottoming out is particularly required for railroad draft gears which are subject to large shocks over a relatively wide range of temperatures including temperatures down to about −40° C.

In the practice of this invention, various 4,4'-methylene dianiline complexes can be used. Generally, complexes of 4,4'-methylene dianiline with a salt, preferably selected from sodium chloride, are used with a mole ratio of said dianiline to the salt being about 3/1.

Low temperature elastomeric properties are important for the draft gears of this invention. Polyethers are known to provide polyurethanes with very good low temperature properties. However, diphenyl methane 4,4'-diisocyanate prepolymers prepared from polyethers were observed to cure to a rubbery state very slowly, even at about 150° C for about 16 hours, using such a 4,4'-methylene dianiline complex. However, it was further observed that, when the polyester polyol/polyether polyol blend was used for the preopolymer, the prepolymer/4,4'-methylene dianiline mixture rubberized readily at about 105°–125° C within about 30-40 minutes. For draft gear purposes, the element, or pad, would generally be cured for an additional 5 to 16 hours, depending somewhat on the exact recipe.

The recipes for preparation of draft gears, or buffers, of this invention have distinct processing advantages. The prepolymer can be maintained at a relatively low temperature in the range of about 65°–85° C, thus minimizing loss of isocyanate content. Shrinkage resulting in defective elements, or pads, is essentially eliminated. Long pot life, or time until mixture set-up, is available after addition of the 4,4'-methylene dianiline. Indeed, the 4,4'-methylene dianiline complex is substantially unactive as a curing agent at about 25° C, but demonstrates a fairly rapid reaction or curing rate at a temperature in the range of about 75° to about 130° C.

To facilitate ease of incorporation to the polyurethane system, particularly rapid mixing with an isocyanate-terminated polyurethane prepolymer, the complex can be conveniently first dispersed in a plasticizer. Generally such a complex dispersion contains about 50 to about 150, preferably about 60 to about 120, parts by weight plasticizer per 100 parts by weight complex. Representative of various preferably relatively chemically inert plasticizers include dioctyl phthalate, tetraethylene glycol di(2-ethyl hexoate) and dibutoxyethoxyethyl formal. Dioctyl phthalate is preferred. Indeed, dioctyl phthalate especially enhances the ease of incorporation into the prepolymer and beneficially modifies and somewhat slows the rate of curing of said prepolymer of a diisocyanate and selected polyester/polyether polyol mixture recipe.

The 4,4'-methylene dianiline can conveniently be prepared, for example, by mixing a dilute aqueous sodium salt solution with salt solution of 4,4'-methylene dianiline in an alcohol, such as methanol or isopropanol, and allowing the mixture to react in about a 1:3 ratio of salt to methylene dianiline. The complex is recovered as a precipitate by rather ordinary means.

In the specification, the term "total average molecular weight of about 1000 to about 1800" is used to describe the total resulting molecular weight equivalent of a mixture of the polyether polyols and the mixture of polyether polyols and polyester polyols. Thus, such a mixture having a total average molecular weight of 1286 can consist of equal amounts of individual polyols having, for example, molecular weights of 1000, 1200 and 2000. Also, for example, a polytetramethylene ether glycol with an average molecular weight of 1143 mixed with a polyester polyol having a molecular weight of 1000, can be the molecular weight equivalent of mixing 100 parts of the polyester polyol having its individual average molecular weight of 1000 with 50 parts each of two polytetramethylene ether glycols having individual average molecular weights of about 1000 to about 2000.

Preferably, the polyether polyol/polyester polyol mixture is selected from (a) polytetramethylene ether gylcols having an average molecular weight of about 900 to about 1100 or a mixture with molecular weights of about 900 to about 1100 and of about 1900 to about 2100 with (b) at least one of the polyester polyols selected from hexane diol adipate and azelate having molecular weights of about 800 to about 1200, tetramethylene azelate having a molecular weight of about 1800 to about 2200 and polyesters of ϵ-caprolactone and diethylene glycol having molecular weights of about 1100 to about 1400 and about 1800 to about 2200.

It is a critical feature of this invention that the ratio of isocyanato groups of the diisocyanate to the sum of the hydroxyl groups of the polyether polyol (polytetramethylene ether glycol) and polyester polyol is from about 1.8 to about 2.5 and preferably from about 1.9 to about 2.2.

It is preferred that a sufficient amount of diamine is used to provide a ratio of primary amino groups to excess isocyanato groups of the diisocyanate over the sum of the hydroxyl groups of the polyether polyols and polyester polyols (reactive hydrogen-containing materials) in the range of about 0.7 to about 1.1 and preferably from about 0.85 to about 0.98. Thus, for example, it is desired that from about 0.7 to about 1.1 moles of the diamine is added to the reaction product of the mixtures comprising correspondingly from about 1.8 to about 2.5 moles, preferably from about 1.9 to about 2.2 moles, of the diisocyanate and about 1 mole of the polyether polyol or mixture of polyether polyol and polyester polyol.

It is a further required feature of the invention that the polytetramethylene ether glycols, the caprolactone polyesters, said adipate, the azelates and their mixtures have an acid number of less than about 1, desirably less than about 0.5 and more preferably less than about 0.1.

The polytetramethylene ether glycol is of the structure and composition typically prepared from tetrahydrofuran with the aid of an alkylene oxide initiator having 2 to 4 carbon atoms, such as ethylene oxide.

The caprolactone polyesters are substantially linear, hydroxyl-terminated polymers prepared by reacting a caprolactone, having 6 carbon atoms in the ring, with a glycol having 4 to 7 carbon atoms and preferably 4 to 6 carbons. Various suitable caprolactones include ϵ-caprolactone, zeta-caprolactone and eta-caprolactone. Alkyl substituted caprolactones can be used with alkyl substituents containing 1 to 2 carbon atoms selected from methyl and ethyl radicals, such as methyl ϵ-caprolactone. Desirably, the caprolactone polyester has a molecular weight in the range of about 800 to about 2200, preferably about 1200 to about 2100, with corresponding hydroxyl numbers in the range of about 140 to about 45 and about 95 to about 55, respectively.

The azelates, or said adipate, preferably have a molecular weight in the range of about 800 to about 2200 with a corresponding hydroxyl number in the range of about 140 to about 50.

Various suitable glycols for the preparation of the polyester polyols include straight chain aliphatic hydrocarbon diols, preferably hydroxyl-terminated diols, and alkylene ether glycols, preferably hydroxyl-terminated, for preparing the caprolactone polyesters, the adipates and azelates. Representative of the straight chain aliphatic hydrocarbon hydroxyl-terminated diols are 1,4-butane diol, 1,5-pentane diol, 1,6-hexane diol, and 1,7-heptane diol. Representative of the alkylene ether glycols is diethylene glycol. The hydrocarbon diols are generally desired for the adipates and azelates with the 1,4-butane diol and 1,6-hexane diol being preferred. The caprolactone polyester of ϵ-caprolactone and diethylene glycol and polyesters selected from tetramethylene adipate, 1,6-hexane diol adipate, tetramethylene azelate and 1,6-hexane diol azelate are particularly desirable. The tetramethylene adipates and azelates are, of course, prepared from 1,4-butane diol and appropriate acid.

The polyesters are typically formed at a temperature of from about 50° to about 300° C and preferably in the range of about 120° and 200° C. A catalyst can be used to increase the reaction rate, if desired. For a more detailed description of preparation of various suitable caprolactone polyesters, reference is made to U.S. Pat. No. 2,933,478.

The resilient polyureaurethane composition can be prepared by first reacting the polyester polyol or polyether polyol and polyester polyol with the diisocyanate under substantially anhydrous conditions at a temperature of from about 70° C to about 130° C for about 15 to about 30 minutes. This reaction can be conducted at atmospheric or above or below atmospheric pressure. A catalyst can be added to the diisocyanate-polymeric polyol or polyol and polyester reaction mixture to reduce its reaction time. When such a catalyst is used, it is usually added to the reaction mixture before the addition of the diisocyanate or with the addition of the diisocyanate. Various catalysts can be used examplary of which are the amine catalysts, such as triethyl amine, n-methyl morpholine and n-ethyl morpholine.

The diamine curative is then added to and mixed with the polymeric product of this reaction sometimes called a prepolymer, under essentially anhydrous condtions. The resulting polyureaurethane reaction mixture is then cast in a suitable mold and cured to form the shaped resilient polyureaurethane composition of this invention. The said reaction mixture can be cured at about 80° to about 100° C, although faster cures can be obtained at higher temperatures, for example, about 100° to about 180° C. Normally the reaction mixture is allowed to cure at about 120° to about 180° C for about 15 minutes to about 3 hours, followed by post curing at about 80° to about 115° C for about 16 to about 24 hours.

When the shaped resilient polyureaurethane composition is prepared by pouring the polyureaurethane reaction mixture into a mold having the desired configuration and then curing the polyureaurethane reaction mixture, metal plates suitable for use as force-receiving plates for the shock absorbing device of this invention can be placed in the mold before curing the polyureaurethane reaction mixture. If desired, a suitable bonding cement such as a phenolic or polyester-polyisocyanate adhesive may be applied to the metal plates. Exemplary are the cements taught to be useful in U.S. Pat. No. 2,992,939 and Australian Pat. No. 256,373. By curing the polyueaurethane reaction mixture in the presence of the said metal plates, a metal plate is adhered to at least one of the force-receiving surfaces of the polyureaurethane member to form a laminate of the structure shown in FIGS. 1 and 2, for instance. Such metal plates generally conform to the planar dimensions of the member's force-receiving surfaces and have a thickness of about 1/16 to about ½ inch, preferably about ⅛ to about ¼ inch, or about 100 to about 200 mils. Preferably, steel plates are used such as hot-rolled mild steel having a carbon content in the range of from about 10/15 to about 10/30 (Society of Automotive Engineers' (SAE) classification).

For further understanding of the invention, reference may be had to the accompanying drawing in which.

Figure 1:
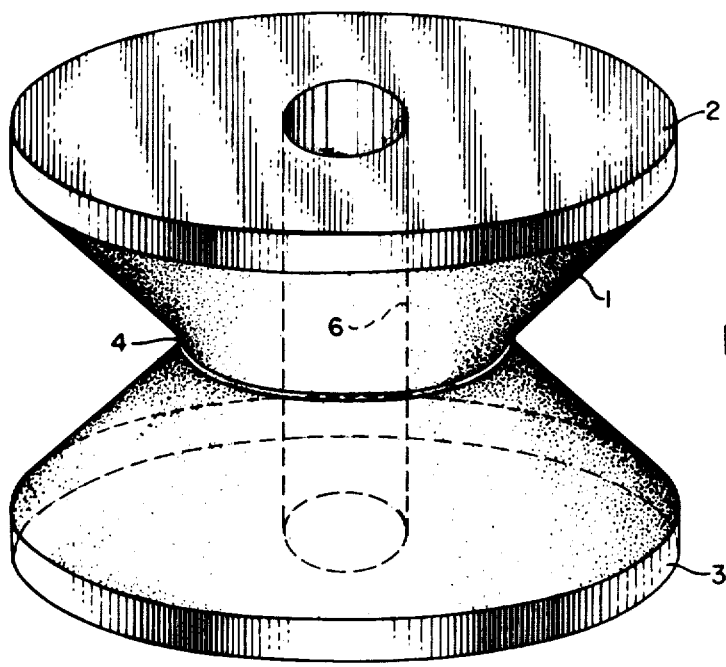
FIG. 1 is a perspective view illustrating one form of the shock absorbing device with optional mounting hole.
Figure 2:
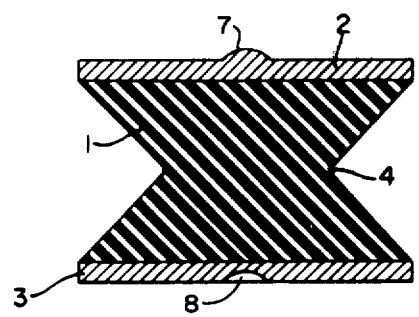
FIG. 2 is a vertical longitudinal sectional view further illustrating the shock absorbing device without the mounting hole.
Figure 3:
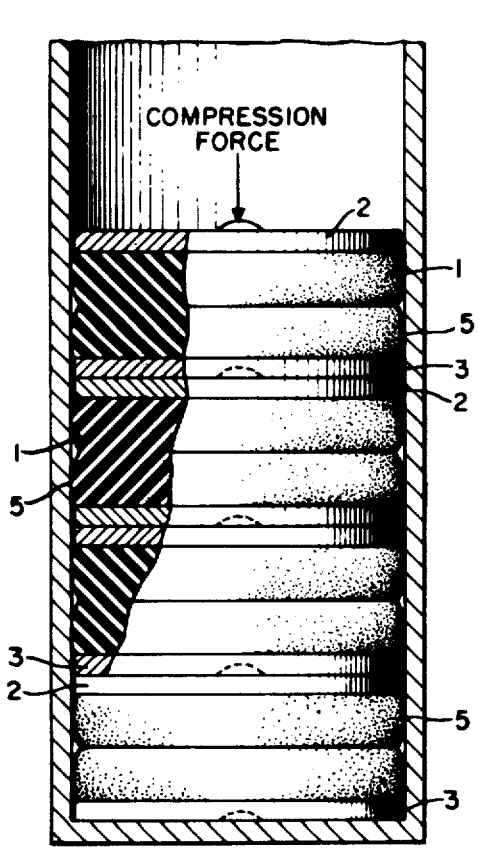
FIG. 3 is a vertical longitudinal sectional view of shock absorbing devices of the type shown in FIG. 1 and FIG. 2 placed in a supporting cylinder and disposed transversely to a compression force and compressed to about 40 percent of their original height.

Referring to the drawings, the shock absorbing devices or units shown in FIG. 1 and FIG. 2 comprise the improved resilient cured polyureaurethane member 1 adhered to two opposite and substantially parallel force-receiving hot-rolled mild steel plates 2 and 3 with mounting boss (7) and indentation (8). If desired, a hole (6) having a diameter of about 0.7 to about 1.3 inches extending from one force-receiving surface to the other can be provided through the member for mounting purposes. A portion of the side-wall of the resilient polyureaurethane member is concave in the form of an indentation such as a V-shaped groove 4. The ratio of the volume displaced by the groove to the volume of the polyureaurethane member plug that displaced by the groove times 100 is about equal to the percent compression anticipated. A suitable railroad draft gear can be formed as illustrated in FIG. 3 under a suitable compression load where the resilient cured polyureaurethane members are deformed and their sidewalls forced laterally outward 5.

The practice of this invention is further illustrated by reference to the following example which is intended to be representative rather than restrictive of the scope of the invention. Unless otherwise indicated, all parts and percentages are by weight.

EXAMPLE 1

Experiments A-C were conducted by first charging to reactors A-C respctively, under essentially anhydrous conditions, various amounts of polyether and polyester polyols consisting of polytetramethylene ether glycols having molecular weights of about 1000 and about 2000, a polyester of ε-caprolactone and diethylene glycol having a molecular weight of about 2000, and a polytetramethylene azelate having a molecular weight of about 2000. The polyester polyols had acid numbers of less than about 0.5. The mixtures of polyols were stirred (as a precautionary measure to remove any potential moisture) under reduced pressure at about 110° C for about an hour. To the polyol mixtures were then added various amounts of diphenylmethane-4,4'-diisocyanate and the mixture stirred and allowed to react to form an isocyanate-terminated prepolymer under reduced pressure at about 80° C to about 120° C for about 15 to about 30 minutes. The prepolymer was cooled to about 70° C and various amounts of diamine complex dispersion in dioctyl phthalate added at about 25° C consisting of 4,4'-methylene dianiline and sodium chloride having a diamine/sodium chloride mole ratio of about 3/1. The dispersion contained about 100 parts dioctyl phthalate per 100 parts by weight of said diamine. The mixture was thoroughly mixed while it was being degassed and the temperature concurrently raised to about 70° C to 80° C.

The following Table 1 illustrates the mixture make-up:

TABLE 1

|  | A | B | C |
| --- | --- | --- | --- |
| Polytetramethylene ether glycol (1000 mw) | 35 | — | 40 |
| Polytetramethylene ether glycol (2000 mw) | 20 | — | 15 |
| ε-caprolactone polyester polyol (1250 mw) | — | 100 | — |
| ε-caprolactone polyester polyol (2000 mw) | 45 | — | — |
| Polytetramethylene azelate (1840 mw) | — | — | 45 |
| Diphenylmethane-4,4'-diisocyanate | 34.9 | 37.7 | 36.0 |
| 4,4'-methylene dianiline/sodium chloride complex in dioctyl phthalate | 25.9 | 28.5 | 28.5 |

The reaction mixtures were then immediately poured or cast into 100°-150° C molds in which had been inserted two circular hot-rolled steel metal plates having an SAE classification of about 10/20 and having diameters of about 6.5 inches and thicknesses of 135 ± 10 mils. The plates had been coated with a polyester-polyisocyanate type of adhesive to enhance their adhesion to the cast polyureaurethane. The mixtures were then immediately submitted to curing in the molds at about 130° C for about 30 minutes to provide polyureaurethane steel laminates as shock absorbing units similar to that shown in FIGS. 1-3 in the drawing of this specification, the shaped resilient polyureaurethane compositions having diameters of 6.5 inches and thicknesses of 1.5 inches. Thus, the overall thickness of the unit was about 1.77 inches. Their sidewalls were in the shape of a V-shaped groove having a volume equal to about two-thirds of the polyureaurethane. The shock absorbing units were further postcured at 105°-120° C for about 4 to 16 hours.

The shock absorbing units initially deflected (compressed) about 0.70 to about 0.80 inch, (from a thickness of about 1.77 inch to a thickness of about 1.01 inch), at about 25° C upon the application of about 175,000 to about 225,000 pounds total force uniformly to the surface areas of steel force-receiving plates.

Shock absorbing units prepared from Experiments A, B and C successfully passed the compressive cycling test for at least about 500 cycles where a unit was alternately compressed under constant compression alternating between about 8 to about 12 percent down to about 45 to about 55 percent of its original polyureaurethane height. More specifically, a unit is compressed from about 8 to about 12 percent down to said 45 to 55 percent and allowed to return to its 8 to 10 percent compression. This may take about 30 seconds. About 2½ minutes later the cycle is repeated. Thus, a cycle takes about 3 minutes. Typically a larger force is required to compress the unit during its first cycle with such force diminishing somewhat for the next 2 to 15 cycles. Then the force tends to level out or stay somewhat constant until the unit begins to break down. At this point, the required force typically rather quickly reduces over a span of a relatively few cycles. Therefore, a typical measure of cycles which a unit suitable for a railroad draft gear can withstand or endure is the number of such three-minute cycles it can withstand until the maximum compressive force necessary to compress it from a compression of about 8 to about 12 percent of its original polyureaurethane uncompressed height down to about 45 to about 55 percent of such height has reduced or dropped about 25 percent of the force required for the first compression cycle.

Portions of each of the polyureaurethane reaction mixtures were cured and shaped to form discs having diameters of about 1.13 inch and thickness of about 0.5 inch. At about −40° C a pressure applied to their flat surfaces of about 6000 to about 8000 pounds per square inch was required to compress the individual discs about 40 percent of their original thicknesses. At 24° C such a compression required from about 2000 to about 2500 pounds per square inch with a maximum of about 2700 being desired.

Thus, the shock absorbing units had desirable load deflections or compressions for use in railroad draft gears for a wide range of temperatures such as from about −20° C to about 25° C and preferably up to about 50° C.

Shock absorbers having polyureaurethane members prepared according to this invention but having too low a mole ratio of diisocyanate to polymeric polyol typically initially deflect more than about 0.8 inch when subjected to the deflection test and are therefore generally considered too soft. Such shock absorbing units when used in a railroad car draft gear typically absorb insufficient amounts of energy and, thus, are usually fully compressed before sufficient compressive force energy is absorbed by the gear during usage. Such shock absorbers having a polyureathane member having too high a ratio of diisocyanate to polymeric polyester typically deflect less than about 0.7 inch when subjected to this test and are therefore generally considered too hard. When used in a railroad draft gear, they typically absorb an insufficient amount of energy before transmitting the energy, or force resulting from coupling the railroad car, through the draft gear and also break down early during usage.

The shock absorbing units are further desirably characterized by a −35° C hammer drop test and by an AAR endurance test.

A hammer drop test is described by first vertically loading a draft gear cylinder with 10 of the shock absorber units or pads similar to FIGS. 1-3 in series to a shock load with their adherent metal force-receiving plates facing each other to form a draft gear. A 27,000 pound hammer is dropped onto the end of the vertically positioned gear from several heights. The impact shock is measured, typically expressed as the height the hammer is dropped in inches, and the capacity of the gear is determined. The capacity of the gear is measured at the point where the gear "bottoms out", ie, when it starts to transmit shock directly from the hammer drop rather than cushion and absorb the shock force. Thus, the gear can typically "bottom out" with a 27,000 pound hammer being dropped from a height of about 18 inches for a 40,000 foot pound shock force. The draft gear is then cooled to −35° C and drop hammered three times with the 27,000 pound hammer for the −35° C hammer drop test. The capacity is measured and the gear disassembled followed by examining the pads. A criterion for failing the hammer drop test is deterioration of the pads such as cracking, particularly at −35° C, or by bottoming out at a shock load less than about 40,000 foot pounds at about 25° C.

The AAR Endurance Test (American Association of Railroads) can be referred to as AAR Spec. M-901-E Endurance Test. The test is generally similar to the −35° C hammer drop test but starting at room temperature or about 25° C. A 27,000 pound hammer is dropped at variable vertical heights of from about 1 to about 30 inches over a period of time until 35 million foot pounds of energy have been expended upon the gear which typically comprises 10 of the shock absorbing units or pads. The capacity of the gear is measured both at the beginning and at the end of the test as well as periodically during the test. The gear capacities before, during and after the test are then compared to determine any changes in capacity which the gear may undergo. The gear is then disassembled and inspected for deterioration of the pads. Appreciable loss of capacity or deterioration of the pads, such as by expressive cracking, are criteria for failing the endurance test. It is preferred that the gear, when composed of 10 of the pads, has a capacity of at least about 40,000 foot pounds before bottoming out, or a capacity of about 4,000 foot pounds per pad at about 25° C. In this test, the 27,000 pound hammer shocks are applied gradually over a period of time to prevent excessive heat build-up because the gear heats up considerably after each hammer drop.

The shock absorbing units of this invention and particularly as described in this example, have unique utility as railroad draft gear shock absorbing units. In practice, the shock absorbing device of a railroad draft gear is typically assembled by the series loading of 8 to 14, preferably 10, of the shock absorbing units of this invention and preferably of the prescribed 6.5 inch diameter shaped polyureaurethane disc having the 1.5 inch thickness and V-grooved sides, followed by placing the units in the device under about 20,000 pounds force or operational use in the railroad car.

In practice of this invention, it is typically desired that the polyureaurethane contain an antioxidant amount of an antioxidant. Thus, it may be typically desired that the polyureaurethane contain in the range of about 0.5 to about 3 and more preferably about 1 to about 2 weight percent of an antioxidant such as an amine or a hindered phenolic type. Usually an amine antioxidant is satisfactory. Usually the antioxidant is mixed with a diol diisocyanate mixture or product or more preferably is simply mixed with the polyol. The addition of the antioxidant is primarily to enhance the maintenance of the shock absorber's desired properties over a long period of time.

In the description of the shock absorbing element of this invention, particularly when used as an assembly thereof mounted in a cylinder under compression in the form of a railroad draft gear, the elements have simply been referred to as being shock absorbing. In this regard, although they do absorb shock caused by the large and repetitive shock loads, they also tend to act somewhat in the nature of a mechanical spring by returning to their original shape after being compressed to cushion the shock from being transmitted directly to the railroad car itself. Although this observation is not necessarily an important one, it is made to acknowledge both a similarity to a mechanical spring and its attributes as a shock absorber.

While certain representative embodiments and details have been shown for the purpose of illustrating the invention, it will be apparent to those having skill in this art that various modifications and changes may be made therein without departing from the spirit or scope of the invention.

What is claimed is:

1. A shock absorbing element, suitable for use in a railroad draft gear, which comprises a shaped resilient polyureaurethane composition, characterized by (A) withstanding compressive cycling for at least about 500 cycles under constant compression alternating between a maximum of about 45 to about 55 percent and a minimum of about 8 to about 12 percent of its original uncompressed height, (B) requiring at least about 4,200 pounds per square inch to compress said unit 55 percent of its original uncompressed height after 500 cycles of said compressive cycling, and (C) deflecting from about 0.3 to about 0.6 inch at about 25° C. upon the application of about 1800 pounds per square inch uniformly to the end surface areas of the said resilient compositions in its uncompressed state when the said composition is a generally disc-shaped cylindrical element with circular parallel end surfaces, said surfaces covered and adhered to circular steel plates, having a diameter of about 6.5 inches, a height of about 1.5 inches and a sidewall connecting the end surfaces substantially in the form of a V-shaped groove having substantially equal length sides, the said groove extending between the said end surfaces, the volume of the solid portion of said element being from 140 to about 160 percent of the volume of the said groove, where said resilient shock absorbing polyureaurethane composition is prepared by the method which comprises reacting a mixture of 100 parts by weight of a complex, dispersed in about 50 to about 150 parts by weight dioctyl phthalate, of 4,4'-methylene dianiline and a salt selected from sodium chloride, sodium bromide, sodium iodide, sodium nitrate, lithium chloride, lithium bromide, lithium iodide, lithium nitrite and sodium cyanide, where the mole ratio of said dianiline to said salt is about 3/1, with the reaction product of (A) a diisocyanate selected from toluene diisocyanate, 1,5-naphthalene diisocyanate, 3,3'-bitolylene-4,4'-diisocyanate, diphenylmethane-4,4'-diisocyanate, and 3,3'-dimethyldiphenylmethane-4,4'-diisocyanate and (B) a mixture of at least one polymeric polyol having a total average molecular weight in the range of about 1,150 to about 1,500, selected from:

1. a mixture of (a) about 55 to about 70 weight percent of at least one polymeric polyol having an average molecular weight of about 1,800 to about 2,200 comprised of (i) about 25 to about 40 weight percent polytetramethylene ether glycol and, correspondingly, (ii) about 75 to about 60 weight percent polyester polyol and, correspondingly, (b) about 45 to about 30 weight percent polytetramethylene ether glycol having a molecular weight in the range of about 800 to about 1,200,
2. a caprolactone polyester of ε-caprolactone and diethylene glycol having a molecular weight in the range of about 1,000 to about 1,400, or
3. a mixture of about 55 to about 70 weight percent of at least on polyol having an average molecular weight in the range of about 1,800 to about 2,200 which comprises (a) about 25 to about 40 weight percent polyester polyol and (b) about 75 to about 60 weight percent polytetramethylene ether glycol and, correspondingly, about 45 to about 30 weight percent of at least one polyol selected from polyester and polytetramethylene ether glycol having a molecular weight in the range of about 800 to about 1,200; wherein said polyester polyol is selected from at least one of (i) caprolactone polyester of ε-caprolactone and diethylene glycol and (ii) polytetramethylene azelate, where the ratio of isocyanato groups to the sum of hydroxyl groups of the polyols is in the range of about 1.9 to about 2.2, where the ratio of primary amino groups of the diamine to excess isocyanato groups over the sum of said hydroxyl groups is about 0.85 to about 0.98 and where the acid number of the polyols is less than about 1.

2. The shock absorbing element of claim 1, of a substantially cylindrical shape having a diameter of about 6.5 inches, a height of said polyureaurethane portion of about 1.5 inches and substantially V-shaped grooved sidewalls, where the volume of said polyureaurethane portion is about 150 percent of said polyureaurethane, and having steel plates adhered to the end surfaces of said cylinder, said polyureaurethane is further characterized by a cold temperature compression test where the polyureaurethane when shaped and cured to a solid circular disc with a straight sidewall having a diameter of about 1.13 inch and a thickness of about 0.5 inch, requires a maximum pressure of 8,000 pounds per square inch, applied to its flat surfaces to compress the disc 40 percent.

3. The shock absorbing element of claim 2 where said 4,4'-methylene dianiline complex is dispersed in a plasticizer, said dispersion containing about 50 to about 150 parts by weight plasticizer per 100 parts by weight complex.

4. The shock absorbing element of claim 3 where said 4,4'-methylene dianiline complex is a complex of 4,4'-methylene dianiline and sodium chloride, and where said plasticizer is dioctyl phthalate.

5. The shock absorbing element of claim 4 where said polyether polyol/polyester polyol mixture is selected from (a) polytetramethylene ether glycols having an average molecular weight of about 900 to about 1,100 or a mixture with molecular weights of about 900 to about 1,100 and of about 1,900 to about 2,100 with (b) at least one of the polyester polyols selected from hexane diol adipate and azelate having molecular weight of about 800 to about 1,200, tetramethylene azelate having a molecular weight of about 1,800 to about 2,200 and polyesters of ε-caprolactone and diethylene glycol having molecular weights of about 1,100 to about 1,400 and about 1,800 to about 2,200, where the ratio of isocyanato groups of the diisocyanate to hydroxyl groups of said polyols is in the range of about 1.9 to about 2.2 and the ratio of primary amino groups to excess isocyanate groups is about 0.85 to about 0.98.

6. The shock absorbing element of claim 3 where said polymeric polyol is a caprolactone polyester of ε-caprolactone and diethylene glycol having a molecular weight in the range of about 1,150 to about 1,350, where said 4,4'-methylene dianiline complex is dispersed in a plasticizer selected from dioctyl phthalate, tetraethylene glycol di(2-ethylhexoate) and dibutoxyethoxyethyl formal.

7. The shock absorbing element of claim 4 where said diisocyanate is diphenyl methane-4,4'-diisocyanate and where said polymeric polyols have a total average molecular weight in the range of about 1,150 to about 1,500 selected from the group consisting of polytetramethylene ether glycol, ε-caprolactone polyester polyol and diethylene glycol, and polytetramethylene azelate, where the ratio of isocyanato groups of the diisocyanate to the sum of hydroxyl groups of the polymeric polyols is in the range of about 1.9 to about 2.2 and the ratio of primary amino groups to excess isocyanato groups over the sum of hydroxyl groups of the polymeric polyols is in the range of about 0.85 to about 0.98.

8. The shock absorbing element of claim 2 loaded in a cylinder in contact with a multiple of said elements in series to a shock load with their rigid force-receiving plates facing each other, where said series consititutes about 8 to about 12 of said shock absorbing elements.

9. The shock absorbing element combination of claim 8 comprised of ten of said shock absorbing elements under compressive load.

10. A method of preparing the shock absorbing element of claim 1 which comprises first positioning circular steel plates having a diameter of about 6.5 inches within opposing mold cavities and applying said mixture of 4,4'-methylene dianiline complex and said polyureaurethane precursors, as a liquid mixture, into said mold cavity, and curing said reaction mixture to create said shock absorbing element.

11. The shock absorbing element of claim 2 having a centered hole with a diameter of about 0.7 to about 1.3 inch extending between said force-receiving surfaces for mounting purposes.

* * * * *